(12) United States Patent
Chen

(10) Patent No.: US 9,798,392 B2
(45) Date of Patent: Oct. 24, 2017

(54) ILLUMINATED KEYBOARD

(71) Applicant: Primax Electronics Ltd., Neihu, Taipei (TW)

(72) Inventor: Chung-Yuan Chen, Taipei (TW)

(73) Assignee: PRIMAX ELECTRONICS LTD., Neihu, Taipei (TW)

( * ) Notice: Subject to any disclaimer, the term of this patent is extended or adjusted under 35 U.S.C. 154(b) by 6 days.

(21) Appl. No.: 14/992,869

(22) Filed: Jan. 11, 2016

(65) Prior Publication Data

US 2017/0147083 A1    May 25, 2017

(30) Foreign Application Priority Data

Nov. 20, 2015 (TW) .............................. 104138520 A

(51) Int. Cl.
 *G06F 3/02* (2006.01)
 *G09G 5/00* (2006.01)
(52) U.S. Cl.
 CPC .................................. *G06F 3/0202* (2013.01)
(58) Field of Classification Search
 CPC ...................................................... G06F 3/0202
 USPC ........................................................ 345/168
 See application file for complete search history.

(56) References Cited

U.S. PATENT DOCUMENTS

| 2011/0157080 A1* | 6/2011 | Ciesla | G06F 3/0202 |
| | | | 345/174 |
| 2013/0069562 A1* | 3/2013 | Bronstein | H01H 13/83 |
| | | | 315/312 |
| 2014/0138228 A1* | 5/2014 | Chen | H01H 13/83 |
| | | | 200/5 A |
| 2014/0166456 A1* | 6/2014 | Chen | H01H 13/83 |
| | | | 200/5 A |

* cited by examiner

*Primary Examiner* — Long D Pham
(74) *Attorney, Agent, or Firm* — Kirton McConkie; Evan R. Witt

(57) ABSTRACT

The present invention discloses an illuminated keyboard, including a base plate and a plurality of keys disposed on the base plate. Each of the keys includes a key cap, an illumination element, an elastic element, and a reflector layer. The key cap is disposed above the base plate, and the elastic element is disposed under the key cap. The illumination element is disposed in the elastic element and the reflector layer is disposed at a side of the illumination element to cover a part of the illumination element, so that the reflector layer reflects the light of the illumination element to the elastic element, and the light is transmitted by the elastic element to the key cap to make the keyboard illuminant.

13 Claims, 10 Drawing Sheets

ILLUMINATED KEYBOARD

FIELD OF THE INVENTION

The present invention relates to a computer keyboard, and in particular, to an illuminated keyboard.

BACKGROUND OF THE INVENTION

Modern people use computer devices regardless of time and place. However, in a dim environment, it is difficult to see keys of a keyboard clearly. Therefore, currently, many computer keyboards are provided with illumination elements, and light guide plates covered on base plates or circuit boards, so that light of the illumination elements is transmitted to positions under or around keys by using the light guide plates, and the light can pass through key caps, thereby enabling the keys to be clearly visible when the keys are used or operated in a dim environment.

However, because a keyboard has a large number of keys, and an area occupied by the keys distributed on the keyboard is large, transmitting light only by using a light guide plate would easily cause that the light is unevenly distributed, the light allocated to each key is relatively weak, and the keys cannot be clearly illuminated. Meanwhile, the arrangement of the light guide plate results in the increase of the thickness of the keyboard. Therefore, there are many problems in the prior art that need to be solved.

SUMMARY OF THE INVENTION

In order to solve the problems in the prior art, the present invention provides an illuminated keyboard. The illuminated keyboard uses structures of keys to guide light, so that light of high intensity can be obtained without the arrangement of a light guide plate, thereby clearly illuminating the keys and reducing the volume and weight of the keyboard.

In order to achieve the foregoing objective, an illuminated keyboard of the present invention includes:
  a base plate;
  a plurality of keys, disposed on the base plate, where each of the keys includes:
    a key cap, disposed above the base plate;
    an illumination element, disposed under the key cap and configured to provide light;
    an elastic element, disposed under the key cap and provided with the illumination element therein, where the elastic element further includes:
      a reflector layer, disposed at one side of the illumination element to cover a part of the illumination element; and
      a support element, connecting the key cap and the base plate and surrounding the elastic element, where the reflector layer reflects the light to the elastic element, and the elastic element transmits the light to the key cap to make the key illuminant.

Preferably, the elastic element includes an accommodating portion for accommodating the illumination element.

Preferably, the elastic element includes a light incoming portion corresponding to the illumination element, and the light incoming portion has a light guide structure for concentrating the light produced by the illumination element.

Preferably, the reflector layer is formed on a surface of the elastic element.

Preferably, a plurality of printed switch circuit layers for generating a plurality of key switch signals is disposed on the base plate.

Preferably, the elastic element is an elastic high polymer light guide element.

Preferably, the support element is a scissor element.

In order to solve the problems of the prior art, the present invention further provides an illuminated keyboard, including:
  a base plate;
  a support plate, disposed on the base plate; and
  a plurality of keys, disposed on the support plate, where each of the keys includes:
    a key cap, disposed above the support plate;
    an illumination element, disposed under the key cap and configured to provide light;
    an elastic element, disposed under the key cap and disposed at one side of the illumination element;
    a reflective cover, disposed at one side of the illumination element to cover a part of the illumination element; and
    a support element, connected to the key cap and surrounding the elastic element,
    where the reflective cover reflects the light to the elastic element, and the elastic element transmits the light to the key cap to make the key illuminant.

Preferably, a reflector sheet disposed on the support plate is further included, where the elastic element is disposed on the reflector sheet, and the reflective cover is formed, by means of extending upward from the reflector sheet, at one side of the illumination element to cover a part of the illumination element.

Preferably, an elastic sheet disposed on the support plate is further included, where the elastic element is integrally disposed on the reflector sheet, and the reflective cover is formed, by means of extending upward from the reflector sheet, at one side of the illumination element to cover a part of the illumination element.

Preferably, the elastic element is disposed on the support plate, and the reflective cover is integrally formed, by means of upward extending from the support plate, at one side of the illumination element to cover a part of the illumination element.

Preferably, the elastic element includes a light incoming portion corresponding to the illumination element, and the light incoming portion has a light guide structure for concentrating the light produced by the illumination element.

Preferably, the support element connects the key cap and the base plate, and surrounds the elastic element.

Preferably, the support element connects the key cap and the support plate, and surrounds the elastic element.

Preferably, a plurality of printed switch circuit layers for generating a plurality of key switch signals is disposed on the base plate.

Preferably, the support plate further includes a plurality of openings that corresponds to the elastic elements respectively and is configured to connect the elastic elements and the switch circuit layers.

Preferably, the keyboard further includes a membrane switch circuit board, disposed on the base plate and located under the elastic elements.

Preferably, the support plate further includes an opening that corresponds to the elastic element respectively and is configured to connect the elastic element and the membrane switch circuit board.

Preferably, the illumination element is a upward-scattering light emitting diode (LED), or a side view LED.

Preferably, the elastic element is an elastic high polymer light guide element.

Preferably, the key cap includes a light transmission portion for the light to pass through the key cap.

DETAILED DESCRIPTION OF THE PREFERRED EMBODIMENT

Further descriptions are made through preferred embodiments in the following with reference to the accompanying drawings.

Figure 1:
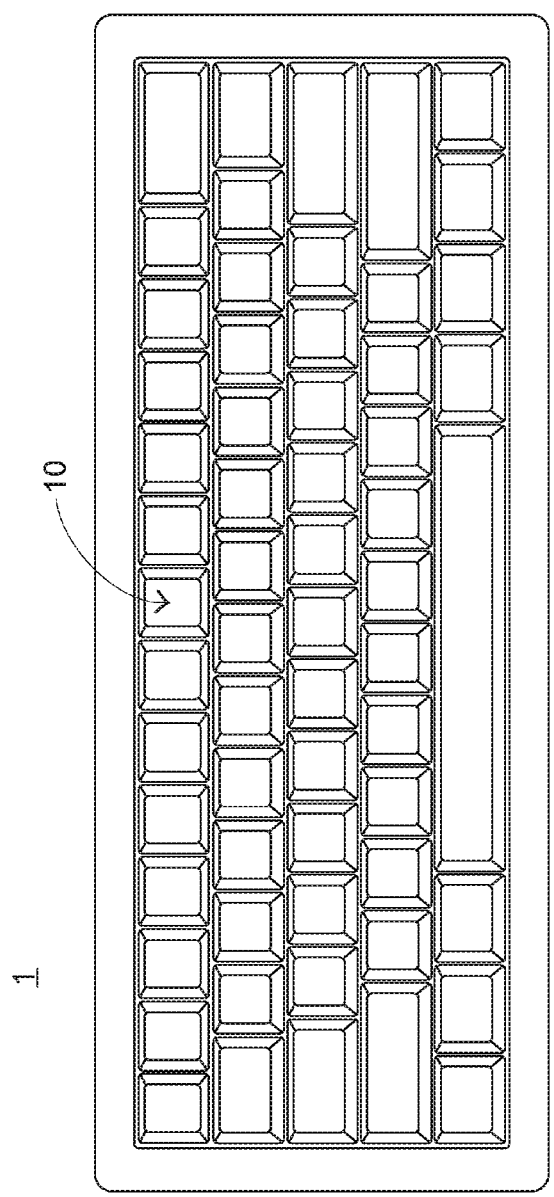
FIG. 1 is a top view of a preferred embodiment of an illuminated keyboard of the present invention.
Figure 2:
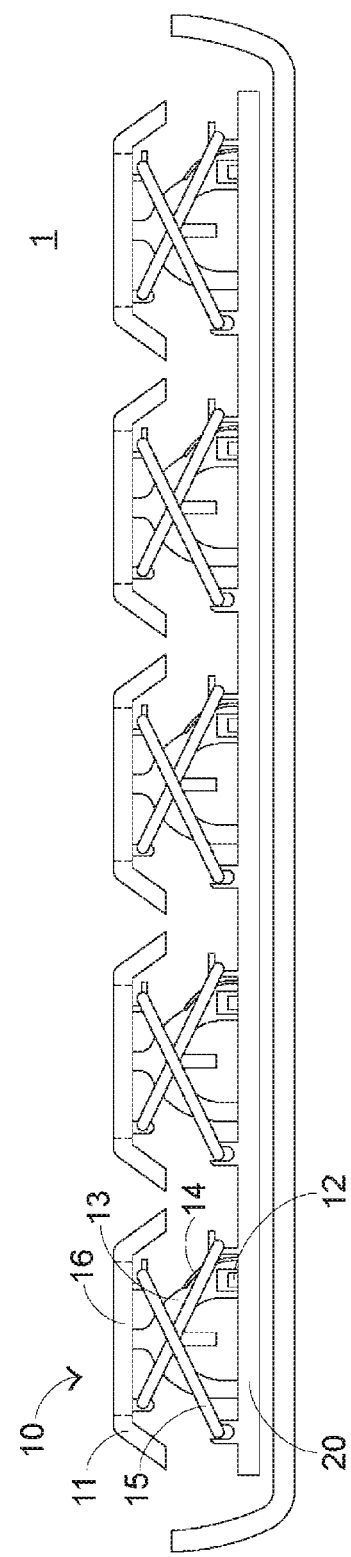
FIG. 2 is a sectional diagram of a first preferred embodiment of the present invention.

First, referring to FIG. 1 and FIG. 2, FIG. 1 is a top view of a preferred embodiment of an illuminated keyboard of the present invention, and FIG. 2 is a sectional diagram of a preferred embodiment of the present invention. An illuminated keyboard 1 of the present invention includes a base plate 20 and a plurality of keys 10. The plurality of keys 10 is disposed on the base plate 20. Each of the keys 10 includes a key cap 11, an illumination element 12, an elastic element 13, a reflector layer 14, and a support element 15. The key cap 11 is disposed on the base plate 20. The elastic element 13 is disposed under the key cap 11. The illumination element is disposed at the interior of the elastic element 13. The reflector layer 14 is disposed at one side of the illumination element 12 to cover a part of the illumination element 12. The support element 15 surrounds the elastic element 13 and connects the base plate 20 and the key cap 11.

Figure 3:
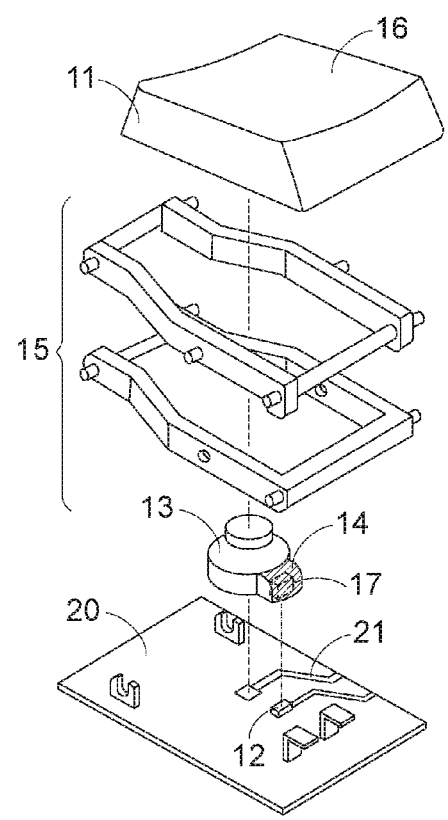
FIG. 3 is a three-dimensional exploded diagram of the first preferred embodiment of the present invention.

Further, referring to FIG. 3, a three-dimensional exploded diagram of a preferred embodiment of the present invention is shown, and descriptions are made by using a single key: the base plate 20 further includes a switch circuit layer 21; the elastic element 13 further includes an accommodating portion 17; the reflector layer 14 is disposed on a surface of the elastic element 13 and covers a part of the illumination element 12; the key cap 11 further includes a light transmission portion 16; the switch circuit layer 21 may be formed on the base plate 20 by means of printing, and is configured to generate a plurality of key switch signals; the key cap 11 is disposed on the base plate 20; the elastic element 13 is located under the key cap 11 and corresponds to the switch circuit layer 21; the illumination element 12 is disposed in the accommodating portion 17; and the support element 15 surrounds the elastic element 13 and connects the base plate 20 and the key cap 11, so that light produced by the illumination element 12 is concentrated by the reflector layer 14, is transmitted to the key cap 11 through the elastic element 13, and is transmitted to the exterior of a key 10 from the light transmission portion 16.

Figure 4:
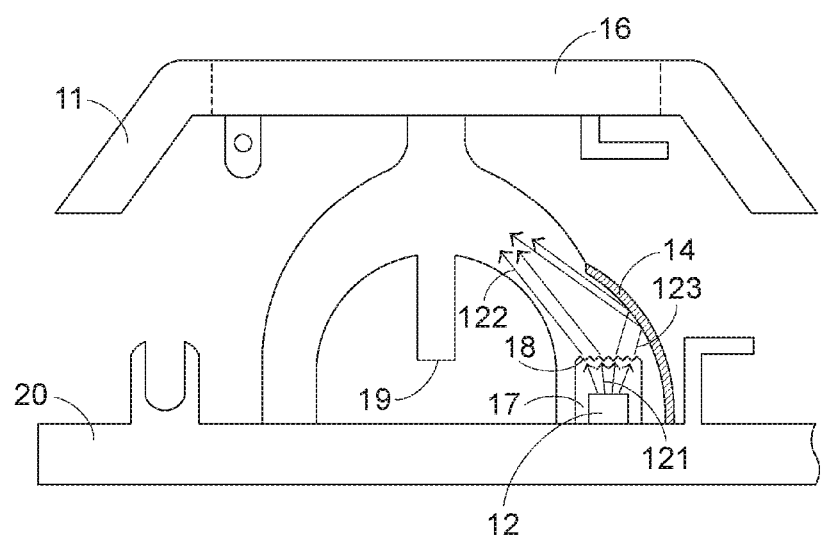
FIG. 4 is a schematic diagram of light transmission according to the first preferred embodiment of the present invention.

For a detailed motion process, reference is made to FIG. 4, a schematic diagram of light transmission according to a preferred embodiment of the present invention. The elastic element 13 further includes a light incoming portion 18 and a triggering portion 19; the light incoming portion 18 is disposed on an inner wall of the accommodating portion 17 and corresponds to the illumination element 12; the light incoming portion 18 has a light guide structure; light 121 produced by the illumination element 12 is diffused in the accommodating portion 17; the light 121 is guided by the light incoming portion 18 to form concentrated light 122; the concentrated light 122 enters the interior of the elastic element 13; and in this case, the concentrated light 122 can be transmitted to the key cap 11 from the interior of the elastic element 13, and is transmitted to the exterior of the key 10 through the light transmission portion 16. The function of the reflector layer 14 is further described. The reflector layer 14 is formed by means of coating a surface of the elastic element 13 with a reflective material. The reflector layer 14 may reflect light. When a part of deviated light 123 of the light 121 produced by the illumination element 12 is not directly transmitted to the interior of the elastic element 13, the part of deviated light 123 may be reflected by the reflector layer 14 to the interior of the elastic element 13, and then be transmitted to the exterior of the key 10 by using the elastic element 13. Therefore, most light produced by the illumination element 12 can be transmitted to the key cap 11, so as to increase the utilization efficiency of the light. In addition, the triggering portion 19 corresponds to the switch circuit layer 21. When the key cap 11 is pressed, an external force is applied to the elastic element 13 so as to enable the triggering portion 19 to move downward, thereby triggering a key switch signal. When the key cap 11 is not pressed, the elastic element 13 is recovered to an original state, and the support element 15 (not shown in FIG. 4, see FIG. 2 and FIG. 3) supports the key cap 11, so that the key cap 11 is recovered to an original position, and a switch signal is not generated.

In a preferred embodiment, the elastic element 13 is an elastic high polymer element capable of guiding light and functioning to transmit light in the interior of the elastic element. The support element 15 is a scissor element.

Figure 5:
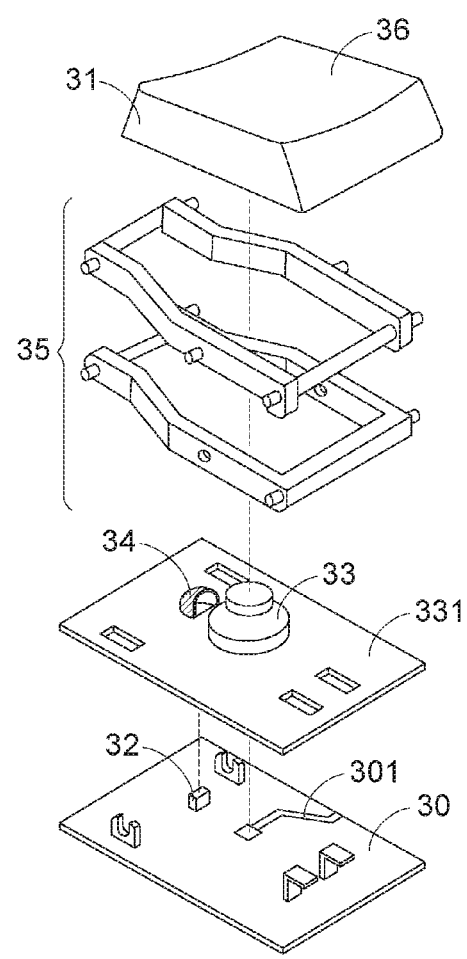
FIG. 5 is a three-dimensional exploded diagram of a key according to a second preferred embodiment of the present invention.

For a second preferred embodiment of the present invention, please refer to FIG. 5, which is a three-dimensional exploded diagram of a key according to the second preferred embodiment. According to the second preferred embodiment of the present invention, a base plate 30, an illumination element 32, an elastic element 33, a support element 45, a key cap 31, and a light transmission portion 36 are included. Arrangement of keys and connection manners of elements in this embodiment are similar to those in the first preferred embodiment, and the part of the same structure is not described herein again. The differences are: the keyboard according to the second preferred embodiment further includes a reflective cover 34 and a support plate; the support plate is an elastic sheet 331; the elastic sheet 331 is disposed on the base plate 30; the elastic element 33 is integrally formed on the elastic sheet 331; a switch circuit layer 301 is disposed on the base plate 30; the elastic element 33 is correspondingly disposed on the switch circuit layer 301; and the reflective cover 34 extends upward from the elastic sheet and is located at one side of the illumination element 32 to cover a part of the illumination element 32, so as to enable light reflected by the reflective cover 34 to enter the elastic element 33.

Figure 6:
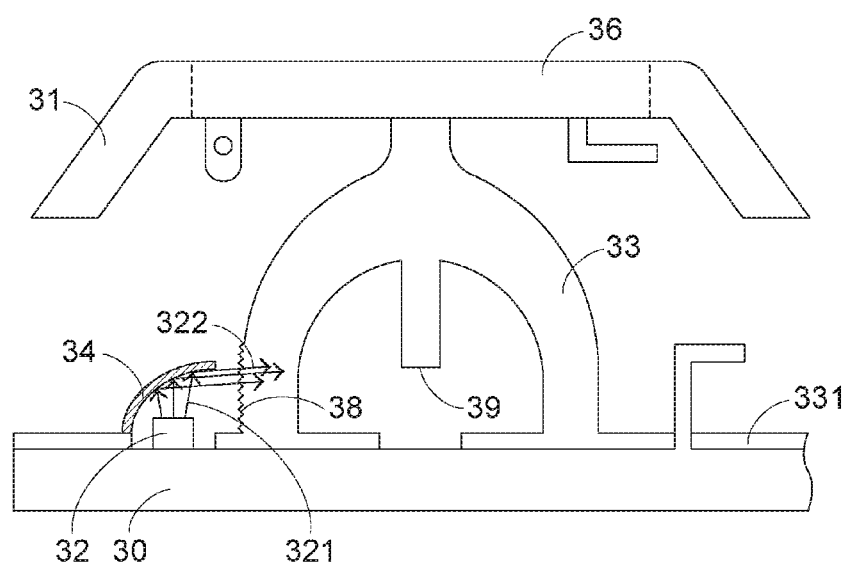
FIG. 6 is a schematic diagram of light transmission according to the second preferred embodiment of the present invention.

Further, referring to FIG. 6, a schematic diagram of light transmission according to the second preferred embodiment is shown, the reflective cover 34 reflects light 321 of the illumination element 32, so that the light 321 is gathered and then incident to the elastic element 33; and a light incoming portion 38 disposed on the elastic element 33 guides the light 321 to form concentrated light 322 and enables the concentrated light 322 to be transmitted to the key cap 31 via the interior of the elastic element 33 and to be transmitted to the exterior through the light transmission portion 36. Meanwhile, a triggering portion 39 of the elastic element 33 can trigger a switch circuit layer 301 to generate a key switch signal.

Figure 7:
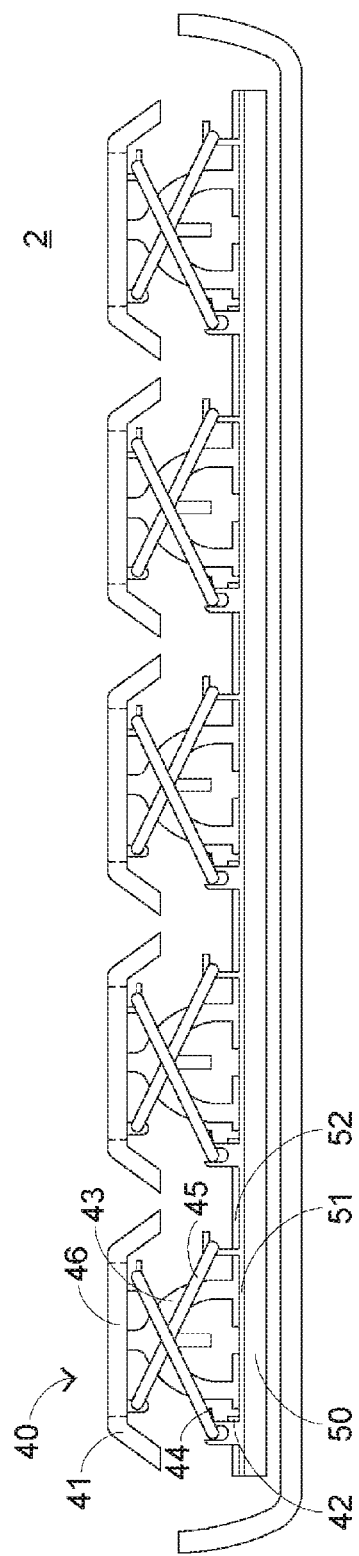
FIG. 7 is a sectional diagram of a third preferred embodiment of the present invention.
Figure 8:
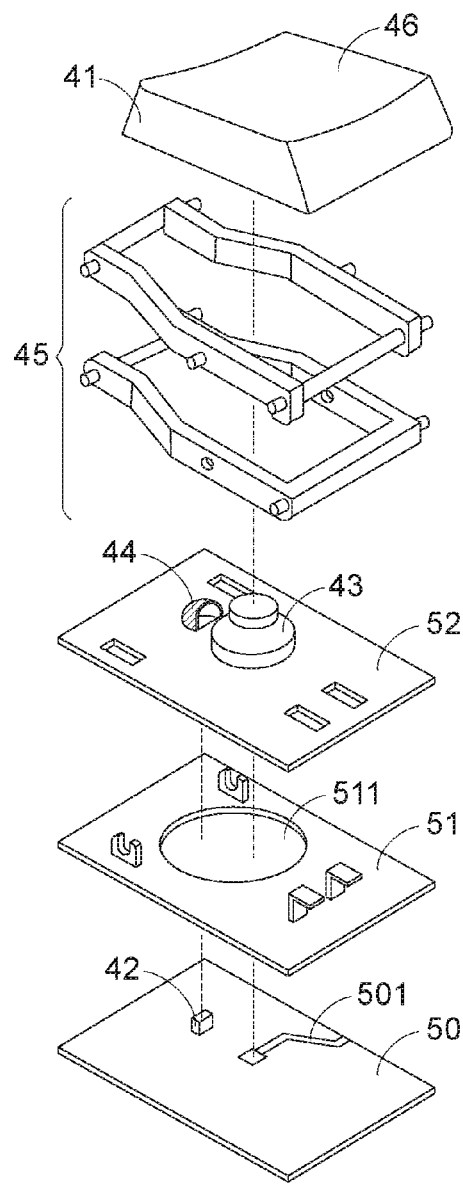
FIG. 8 is a three-dimensional exploded diagram of a key according to the third preferred embodiment of the present invention.

Further, referring to FIG. 7, a sectional diagram of a third preferred embodiment of the present invention is shown, and referring to FIG. 8, a three-dimensional exploded diagram of the third preferred embodiment of the present invention is shown. The present invention further provides an illuminated keyboard 2, including: a base plate 50, a support plate 51, and a plurality of keys 40, where the support plate 51 is disposed on the base plate 50; the plurality of keys 40 is disposed on the support plate 51; and each key 40 includes a key cap 41, a light transmission portion 46, an illumination element 42, an elastic element 43, a reflective cover 44, and a support element 45. The connections of key elements in the third preferred embodiment are similar to those in the foregoing second preferred embodiment, and the same part is not described herein again. The differences are: the keyboard according to the third preferred embodiment further includes a reflector sheet 52 and an opening 511; the reflector sheet 52 is disposed on the support plate 51; the reflective cover 44 is disposed on the reflector sheet 52; and the opening 511 is disposed on the support plate, so that the elastic element 43 is in communication with the base plate 50.

Furthermore, referring to FIG. 8, a three-dimensional exploded diagram of the third preferred embodiment of the present invention is shown, and descriptions are made by using a single key: the reflector sheet 52 included in the illuminated keyboard 2 according to the third preferred embodiment of the present invention is a sheet body made of a reflective material or a sheet body of which a surface is coated with a reflective coating, and functions to reflect light; the elastic element 43 is disposed on the reflector sheet 52; the reflective cover 44 extends upward from the reflector sheet 52 and is located at one side of the illumination element 42 to cover a part of the illumination element 42; a switch circuit layer 501 is printed on an upper surface of the base plate 50; the elastic element 43 is in communication with the switch circuit layer 501 by using an opening 511; the support element 45 connects the support plate 51 and the key cap 41 and surrounds the elastic element 43; the elastic element 43 is preferably an elastic high polymer element capable of guiding light and functions to transmit light in the interior of the elastic element; and the support element 45 is a scissor element.

Figure 9:
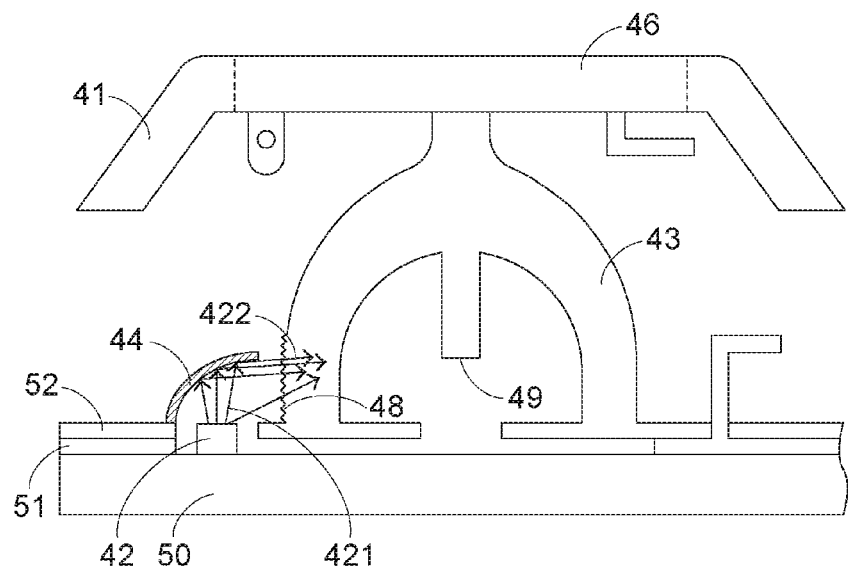
FIG. 9 is a schematic diagram of light transmission according to the third preferred embodiment of the present invention.

For a detailed light motion process, reference is made to FIG. 9, a schematic diagram of light transmission according to the third preferred embodiment of the present invention. The illumination element disclosed in the present invention includes two types, where the first type is an upward-scattering LED, and the second type is a side view LED. Light emitted from the first type of upward-scattering LED is emitted from the top of an LED and is diffused outwardly. Light emitted from the second type of side view LED is emitted from a side of an LED and is a directional light source that irradiates towards the same direction. First, a light transmission process of the upward-scattering LED is illustrated. Light 421 emitted from the illumination element 42 is diffused upward to the reflective cover 44; the reflective cover 44 reflects the light 421; then the light 421 is guided by the light incoming portion 48 of the elastic element 43 to enter the interior of the elastic element 43, and forms concentrated light 422; and at this time, the concentrated light 422 is transmitted to the key cap 41 via the interior of the elastic element 43 and is transmitted to the exterior of the key 40 through the light transmission portion 46, so as to make the key 40 illuminant. Meanwhile, a triggering portion 49 corresponds to a switch circuit layer 501, so as to trigger a key switch signal.

Figure 10:
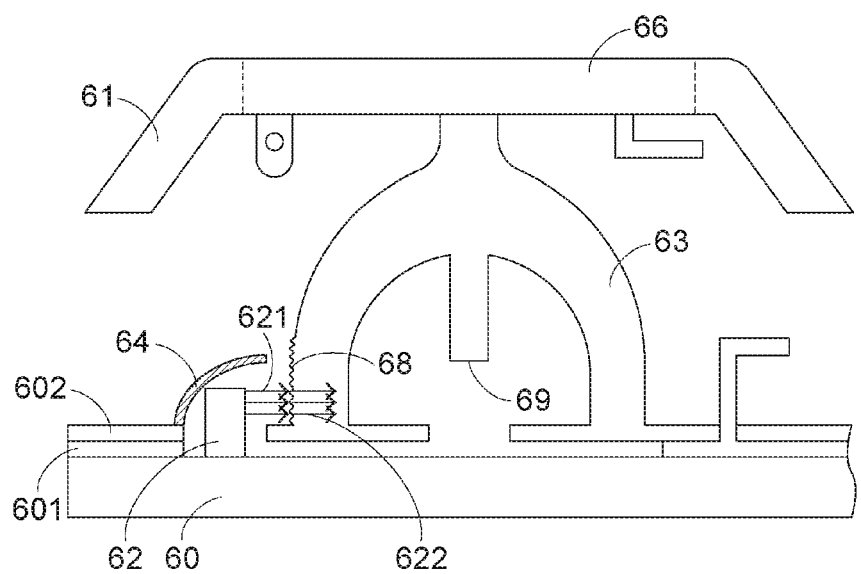
FIG. 10 is a schematic diagram of light transmission according to a fourth preferred embodiment of the present invention.

Second, referring to FIG. 10, a schematic diagram of light transmission according to a fourth preferred embodiment of the present invention is shown. A light transmission process of a side view LED is illustrated. Light 621 emitted from the side view LED irradiates towards the direction of an elastic element 63; the light 621 is guided by a light incoming portion 68 to form concentrated light 622; the concentrated light 622 is transmitted to a key cap 61 via the interior of the elastic element 63 and is transmitted to the exterior of the key through a light transmission portion 66; and a reflective cover 64 reflects and collects deviated light to ensure that the light 621 enters the interior of the elastic element 63, so as to make a key illuminant.

Figure 11:
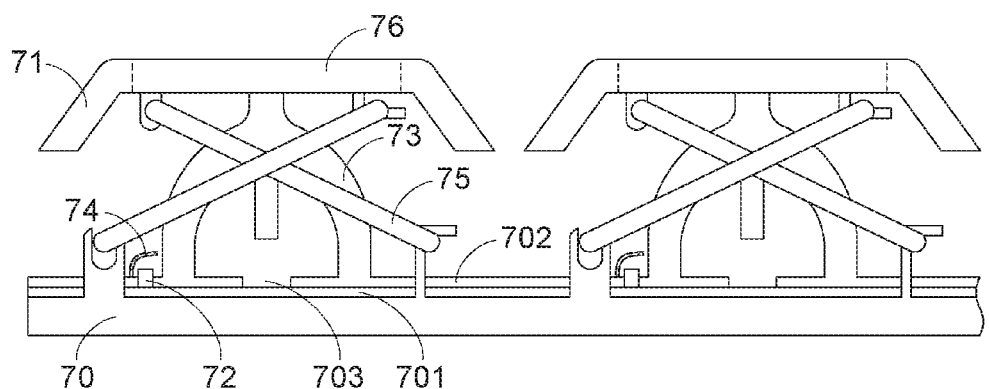
FIG. 11 is a sectional diagram of a key according to a fifth preferred embodiment of the present invention.

FIG. 11 is a sectional diagram of a fifth preferred embodiment of the present invention. According to the fifth preferred embodiment of the present invention, a base plate 70, a key cap 71, an illumination element 72, an elastic element 73, a reflective cover 74, a support element 75, a light transmission portion 76, and a support plate are included, where the support plate is an elastic sheet 702. The connections and structures of elements in the fifth preferred embodiment are similar to those in the third preferred embodiment, and the same part is not described herein again. The differences are: according to the fifth preferred embodiment, a membrane switch circuit board 701 and an opening 703 are further included; the membrane switch circuit board 701 is disposed on the base plate 70; the support element 75 connects the base plate 70 and the key cap 71; the elastic sheet 702 is disposed on the membrane switch circuit board 701; the elastic element 73 is integrally formed on the elastic sheet 702; the reflective cover 74 is formed, by means of extending upward from the elastic sheet 702, at one side of the illumination element 72 to cover a part of the illumination element 72; the light reflected by the reflective cover 74 enters the elastic element 73, and the light is transmitted through the light transmission portion 76 of the key cap 71, so as to make a key illuminant; and the opening 703 is opened on the elastic sheet 702 and corresponds to the elastic element 73, so that the elastic element 73 is in communication with the membrane switch circuit board 701, and the elastic element 73 can trigger the membrane switch circuit board 701 to generate a switch signal.

Figure 12:
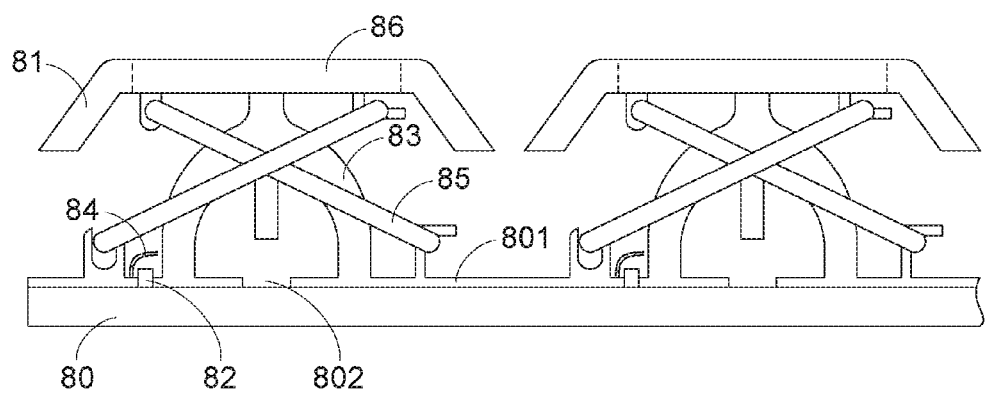
FIG. 12 is a sectional diagram of a key according to a sixth preferred embodiment of the present invention.

FIG. 12 is a sectional diagram of a key according to a sixth preferred embodiment of the present invention. According to the sixth preferred embodiment, a base plate 80, a support plate 801, a key cap 81, an illumination element 82, an elastic element 83, a reflective cover 84, a support element 85, and a light transmission portion 86 are included. The connections and structures in the sixth preferred embodiment are similar to those in the third preferred embodiment, and the same part is not described herein again. The differences are: in the present embodiment, the support plate 801 is directly disposed on the base plate 80; the support element 85 is connected to the support plate 801; the reflective cover 84 is integrally formed, by means of extending upward from the support plate 801, at one side of the illumination element 82 to cover a part of the illumination element 82; and light reflected by the reflective cover 84 enters the elastic element 83, and the light is transmitted through the light transmission portion 86 of the key cap 81, so as to make the key illuminant. In addition, a switch line is printed on the base plate 80. The arrangement of the switch line is the same as that in the third preferred embodiment (as shown in the switch line 501 of FIG. 8), and therefore, the drawing and mark are not drawn repeatedly. The support plate 801 has an opening 802 corresponding to the elastic element 83 for enabling the elastic element 83 and the switch line to be in communication with each other, so that the elastic element 83 may trigger the generation of a key switch signal.

In conclusion, the illuminated keyboard of the present invention can guide light by using the composition structures and the elastic elements of keys, so that light of high intensity can be obtained without the arrangement of a light guide plate, thereby clearly illuminating the keys and reducing the volume and weight of the keyboard. Therefore, the problems generated from the prior art can be solved.

The foregoing descriptions are merely preferred embodiments of the present invention, but are not intended to limit the scope of the claims of the present application. Therefore, all the equivalent variations and modifications without departing from the spirit of the present application also fall within the scope of the present application.

What is claimed is:

1. An illuminated keyboard, comprising:
    a base plate;
    a support plate, disposed on the base plate; and
    a plurality of keys, disposed on the support plate, wherein each of the keys comprises:
        a key cap, disposed above the support plate;
        an illumination element, disposed under the key cap and configured to provide light;
        an elastic element, disposed under the key cap and disposed at one side of the illumination element;
        a reflective cover, disposed at one side of the illumination element to cover a part of the illumination element; and
        a support element, connected to the key cap and surrounding the elastic element,
    wherein the reflective cover reflects the light to the elastic element, and the elastic element transmits the light to the key cap to make the key illuminant, wherein the support plate is an elastic sheet; the elastic element is integrally formed on the elastic sheet; and the reflective cover is formed, by means of extending upward from the elastic sheet, at one side of the illumination element to cover a part of the illumination element.

2. The illuminated keyboard according to claim 1, further comprising: a reflector sheet, disposed on the support plate, wherein the elastic element is disposed on the reflector sheet, and the reflective cover is formed, by means of extending upward from the reflector sheet, at one side of the illumination element to cover a part of the illumination element.

3. The illuminated keyboard according to claim 1, wherein the elastic element is disposed on the support plate, and the reflective cover is integrally formed, by means of extending upward from the support plate, at one side of the illumination element to cover a part of the illumination element.

4. The illuminated keyboard according to claim 1, wherein the elastic element comprises a light incoming portion corresponding to the illumination element, and the light incoming portion has a light guide structure for concentrating the light produced by the illumination element.

5. The illuminated keyboard according to claim 1, wherein the support element connects the key cap and the base plate, and surrounds the elastic element.

6. The illuminated keyboard according to claim 1, wherein the support element connects the key cap and the support plate, and surrounds the elastic element.

7. The illuminated keyboard according to claim 1, wherein a plurality of printed switch circuit layers for generating a plurality of key switch signals is disposed on the base plate.

8. The illuminated keyboard according to claim 7, wherein the support plate further comprises a plurality of openings that corresponds to the elastic elements respectively and is configured to connect the elastic elements and the switch circuit layers.

9. The illuminated keyboard according to claim 1, wherein the keyboard further comprises a membrane switch circuit board disposed on the base plate and located under the elastic elements.

10. The illuminated keyboard according to claim 9, wherein the support plate further comprises an opening that corresponds to the elastic element respectively and is configured to connect the elastic element and the membrane switch circuit board.

11. The illuminated keyboard according to claim 1, wherein the illumination element is an upward-scattering light emitting diode (LED), or a side view LED.

12. The illuminated keyboard according to claim 1, wherein the elastic element is an elastic high polymer light guide element.

13. The illuminated keyboard according to claim 1, wherein the key cap comprises a light transmission portion for the light to pass through the key cap.

* * * * *